(12) United States Patent
Coon

(10) Patent No.: US 10,000,175 B2
(45) Date of Patent: Jun. 19, 2018

(54) DRIVER AIRBAG COVER WITH EMBLEM

(71) Applicant: Key Safety Systems, Inc., Sterling Heights, MI (US)

(72) Inventor: Jeffery Coon, Sterling Heights, MI (US)

(*) Notice: Subject to any disclaimer, the term of this patent is extended or adjusted under 35 U.S.C. 154(b) by 0 days. days.

(21) Appl. No.: 15/315,397

(22) PCT Filed: Jun. 4, 2015

(86) PCT No.: PCT/US2015/034192
§ 371 (c)(1),
(2) Date: Dec. 1, 2016

(87) PCT Pub. No.: WO2015/187945
PCT Pub. Date: Dec. 10, 2015

(65) Prior Publication Data
US 2017/0113644 A1    Apr. 27, 2017

Related U.S. Application Data

(60) Provisional application No. 62/008,146, filed on Jun. 5, 2014.

(51) Int. Cl.
*B60R 21/216* (2011.01)
*B60R 21/2165* (2011.01)
*B60R 21/215* (2011.01)

(52) U.S. Cl.
CPC ........ *B60R 21/2165* (2013.01); *B60R 2021/21506* (2013.01); *B60R 2021/21543* (2013.01)

(58) Field of Classification Search
CPC ...... B60R 21/2165; B60R 2021/21506; B60R 2021/21543
See application file for complete search history.

(56) References Cited

U.S. PATENT DOCUMENTS

| 5,772,240 | A | 6/1998 | Vavalidis | |
| 6,168,189 | B1* | 1/2001 | Dennis | B60R 21/2165 280/728.3 |
| 2004/0070181 | A1* | 4/2004 | Hayashi | B60R 21/2165 280/728.3 |
| 2004/0256840 | A1* | 12/2004 | Lutter | B60R 21/2035 280/728.3 |
| 2005/0067815 | A1* | 3/2005 | Dearden | B60R 21/21656 280/728.3 |
| 2006/0202446 | A1* | 9/2006 | Chavez | B60R 21/21656 280/728.3 |

(Continued)

FOREIGN PATENT DOCUMENTS

DE    102006054590 B3    1/2008
DE    102006055861 B3    2/2008

*Primary Examiner* — Darlene P Condra
(74) *Attorney, Agent, or Firm* — Markell Seitzman

(57) ABSTRACT

A side airbag cover (20) having a top surface (22) upon which can be positioned a decorative emblem (30), the top surface (20) and emblem (30) are configured to break when subjected to a determinable force pressuring on an undersurface (25) of the cover (20), the undersurface (25) including a tear seam (40) which breaks when subjected to a determinable pressure or load, the emblem (30) having its own tear seam (50), wherein the emblem tear seam (50) is displaced laterally relative to an adjacent portion of the tear seam (40).

20 Claims, 2 Drawing Sheets

(56) References Cited

U.S. PATENT DOCUMENTS

| | | | |
|---|---|---|---|
| 2011/0148079 A1* | 6/2011 | Dargavell | B60R 21/2165 |
| | | | 280/728.3 |
| 2012/0030980 A1* | 2/2012 | Sella | B60R 21/215 |
| | | | 40/663 |
| 2015/0001834 A1* | 1/2015 | Wisniewski | B26F 1/24 |
| | | | 280/728.3 |
| 2015/0239417 A1* | 8/2015 | Kawabe | B60R 13/005 |
| | | | 280/728.2 |
| 2015/0298641 A1* | 10/2015 | Barr | B26F 1/24 |
| | | | 280/728.3 |

* cited by examiner

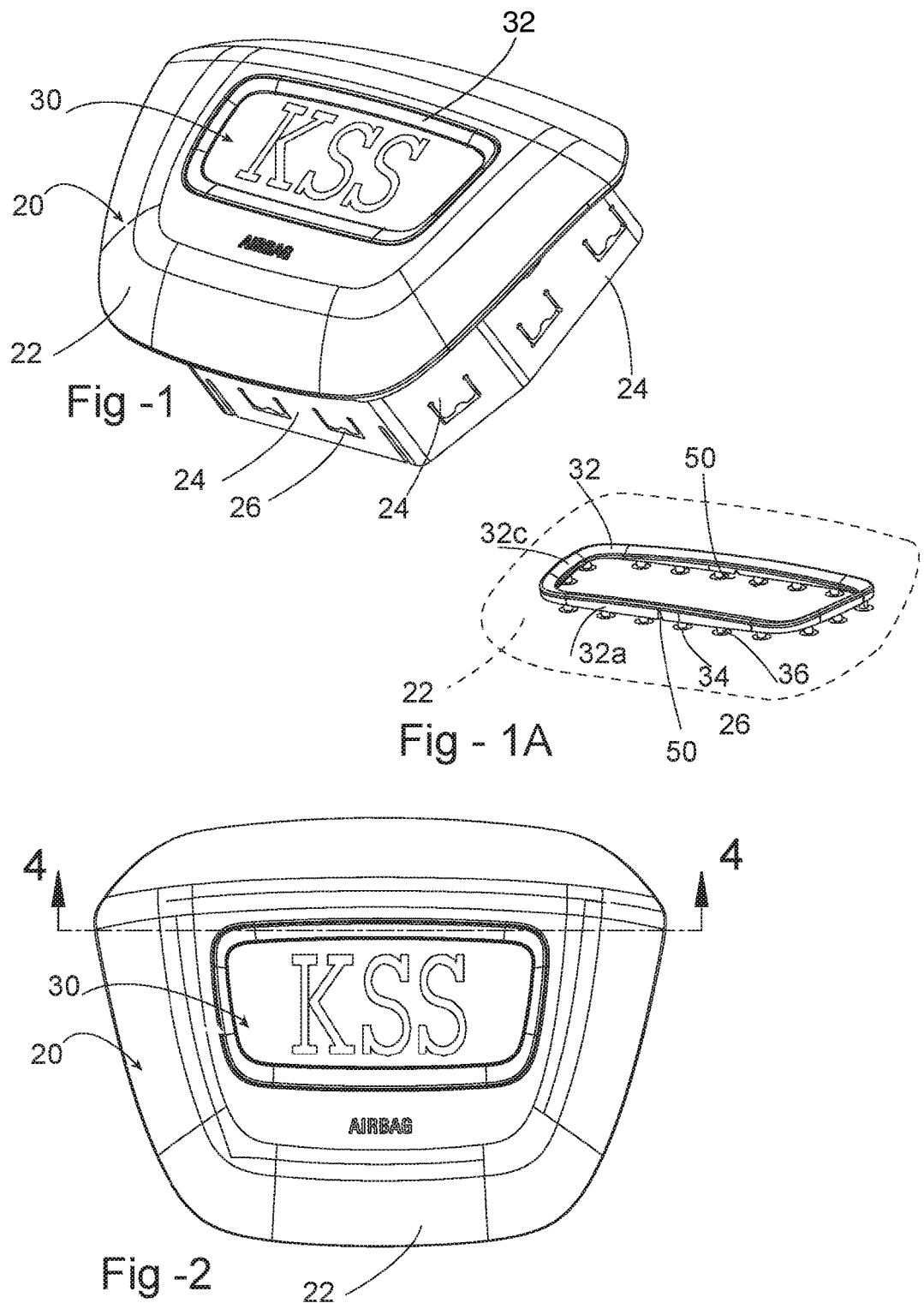

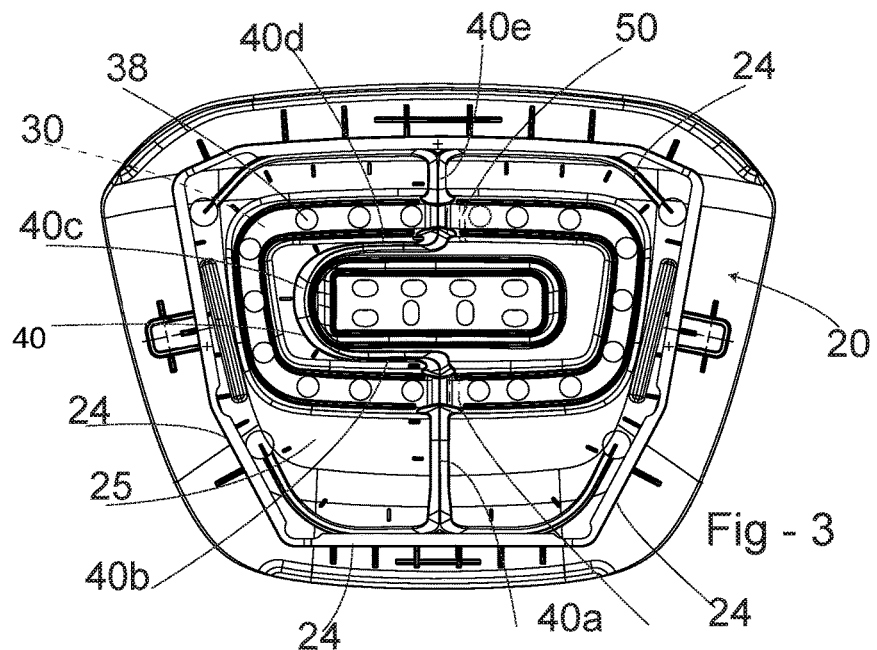
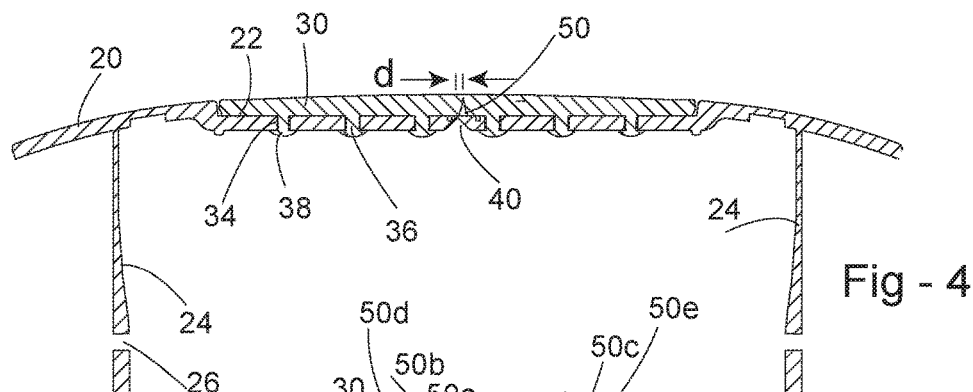
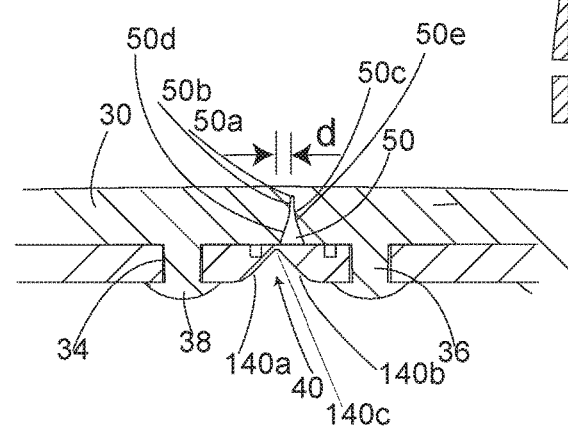
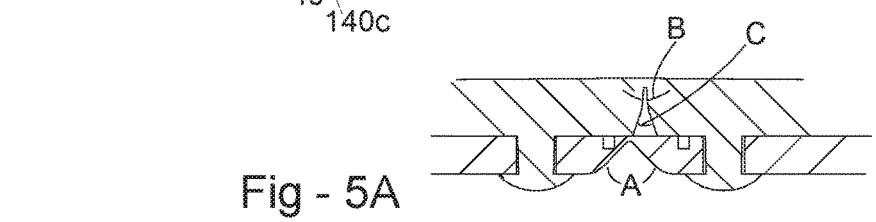
Fig - 3
Fig - 4
Fig - 5
Fig - 5A

DRIVER AIRBAG COVER WITH EMBLEM

BACKGROUND AND SUMMARY OF THE INVENTION

The present invention generally relates to the construction of airbag covers and more particularly to such covers having a decorative emblem.

The invention comprises: an airbag cover having a top surface upon which can be positioned a decorative emblem, the top surface and emblem are configured to break when subjected to a determinable force or pressure on an undersurface of the cover, the undersurface including a tear seam which breaks when subjected to a determinable pressure or load, the emblem having its own tear seam, wherein the tear seam of the emblem is displaced relative to an adjacent portion of the tear seam.

BRIEF DESCRIPTION OF THE DRAWINGS

FIG. 1 shows a prior art driver airbag cover with an emblem that is usable with the present invention.

FIG. 1A shows further details of the construction of the cover of FIG. 1.

FIG. 2 is a top plan view of the cover and emblem in FIG. 1.

FIG. 3 is a plan view looking at the underside of the top of the cover in FIG. 1 and which also shows the present invention.

FIG. 4 is a cross-sectional view through section 4-4 of FIG. 3.

FIG. 5 is an exploded view of a portion of FIG. 4.

FIG. 5A is a further exploded view of FIG. 5

DETAILED DESCRIPTION OF THE DRAWINGS

FIG. 1 illustrates a representative construction of the driver airbag cover 20. This cover includes a top surface 22 and a multi-sided-walled member 24 with a plurality of flexible tabs of known construction 26 used to connect the cover 20 to a cooperating housing, which is not shown. Positioned upon a flat portion of the top surface 22, is a multi-sided ring 32. As shown in FIG. 1A surface 22 has a plurality of holes 34. Emblem 30, below its ring 32, includes a plurality of integrally formed legs or pins 36, each leg is inserted into a respective hole 34; these legs or pins 36 are heat staked such as to form a head 38 to hold the emblem securely to the cover 20.

Reference is made to FIG. 3 which shows the underside of the cover of FIG. 1. As is known in the art, cover 20 is used in combination with an airbag which is mounted in a folded condition into a housing which is not shown and which is well known in the art. Upon activation of the airbag, the airbag pushes against the underside 25 of cover 20 causing the cover and emblem to break, thereby enabling the airbag to expand fully to protect an occupant of the vehicle. Airbag covers such as 20 include one or more tear seems to facilitate and control how the cover opens under the force of the inflating airbag. Cover 20 on its undersurface or undersurface 25 includes such a tear seam generally designated as 40; this tear seam has a central leg 40a which in FIG. 3 is arranged vertically, which transitions into a lateral section 40b, then into a curved section 40c, into another lateral section 40d, which then transitions into another central leg 40e. With reference to the cross-sectional view top center portion of FIG. 4 as well as to FIG. 5, as can be seen, the general shape of each section of the tear seam 40 is generally triangular. Tear seam 40 includes a generally triangular shaped portion with two opposed tapered legs 140a and 140b with a generally flat center 140c. The width of flat center 140c is approximately 0.3 mm, and the angle A, between tapered legs 140a and 140b is about 40 degrees. Emblem tear seam 50 as shown is somewhat more complex than tear seam 40. Emblem tear seam 50 also includes a center flat portion 50a which is about 0.5 mm wide. The center portion of emblem tear seam 50 is generally triangular in shape with the angle B between legs 50b and 50c generally about 10 degrees. The emblem tear seam 50 has another triangular portion with legs 50d and 50e, and the angle C between these legs is about 25 degrees. The angle between legs 50b and 50c is less than the angle between legs 50d and 50e and the angle between legs 40a and 40b is larger than each of the foregoing angles.

As can be seen in FIGS. 3, 4 and 5 the two tear seams 40 and 50 are offset by a dimension d which can be in the range of about 2 to 5 mm. The cross-sectional view through any of the other parts of tear seam 40 will look substantially as shown in FIG. 4. The benefit of offsetting tear seems 40 and 50 is the increased strength compared to when the tear seams are over each other. Consider the following, with regard to the prior art cover and emblem combination with tear seams aligned one to the other, there is no structural support in the vicinity of the aligned and relatively long tear seams, so when the cover or emblem is pushed from the outside the cover and emblem bend and/or may break relatively easily in view of this lack of support in the regions of the aligned tear seams. This is not the case with the present invention. When the tear seams are offset as in the present invention, the material on the cover and the material of the emblem form a bridge relative to each other creating a stronger effective tear seam region or, said another way, the cover/emblem is self-reinforced. This is also important as over the life of the vehicle the cover is pushed thousands of times to activate the horn and the present invention will display superior performance. An additional benefit is the performance of the airbag, cover and emblem of the present invention is substantially the same as the prior art during deployment of the airbag.

Many changes and modifications in the above-described embodiment of the invention can, of course, be carried out without departing from the scope thereof. Accordingly, that scope is intended to be limited only by the scope of the appended claims.

The invention claimed is:

1. A driver-side airbag cover (20) having a top surface (22) configured to receive a decorative emblem (30) affixed thereto, the top surface (22) and emblem (30) are configured to break when subjected to a determinable force pressuring on an undersurface (25) of the cover (20), the undersurface (25) including a tear seam (40) which breaks when subjected to a determinable pressure or load, the emblem (30) having an emblem tear seam (50), wherein the emblem tear seam (50) is displaced laterally relative to an adjacent portion of the tear seam (40), wherein the two tear seams (40) and (50) are offset by a dimension d which can be in the range of about 2 to 5 mm.

2. The driver-side airbag cover of claim 1 wherein the emblem (30) has a multi-sided ring (32), the ring (32), includes a plurality of integrally formed legs or pins (36), each leg is inserted into a respective hole (34) of the top surface (22).

3. The driver-side airbag cover of claim 2 wherein each leg or pin (36) is heat staked such as to form a head (38) to hold the emblem (30) securely to the cover (20).

4. The driver-side airbag cover of claim 1 wherein the tear seam (40) has a central leg (40a) arranged vertically, which transitions into a lateral section (40b), then into a curved section (40c), into another lateral section (40d), which then transitions into another central leg (40e) wherein a cross-sectional general shape of each section of the tear seam (40) is generally triangular.

5. The driver-side airbag cover of claim 4 wherein the cross-section of the tear seam (40) includes a generally triangular shaped portion with two opposed tapered legs (140a) and a lateral leg (140b) with a generally flat center (140c).

6. The driver-side airbag cover of claim 5 wherein a width of the flat center (140c) is approximately 0.3 mm, and an angle A, between legs (140a) and (140b) is about 40 degrees.

7. The driver-side airbag cover of claim 6 wherein emblem tear seam (50) has a cross-sectional general shape of a section of the emblem tear seam (50) that is generally triangular includes a center flat portion (50a) which is about 0.5 mm wide.

8. The driver-side airbag cover of claim 7 wherein the cross-section of a center portion of emblem tear seam (50) is generally triangular in shape with an angle B between legs (50b) and (50c) of about 10 degrees.

9. The driver-side airbag cover of claim 8 wherein emblem tear seam (50) has another triangular portion with legs (50d) and (50e), and an angle C between these legs is about 25 degrees.

10. The driver-side airbag cover of claim 9 wherein the angle between legs (50b) and (50c) is less than the angle between legs (50d) and (50e) and the angle between legs (140a) and (140b) is larger than each of the foregoing angles.

11. The driver-side airbag cover of claim 1 wherein offsetting tear seams (40) and (50) exhibits increased strength compared to when the tear seams are aligned.

12. The driver-side airbag cover of claim 11 wherein the tear seams (40) and (50) being offset form a bridge between material on the cover (20) and material of the emblem (30) creating a stronger effective tear seam region over the cover (20) and emblem (30) which is thereby self-reinforced.

13. A driver-side airbag cover (20) having a top surface (22) configured to receive a decorative emblem (30) affixed thereto, the top surface (22) and emblem (30) are configured to break when subjected to a determinable force pressuring on an undersurface (25) of the cover (20), the undersurface (25) including a tear seam (40) which breaks when subjected to a determinable pressure or load, the emblem (30) having an emblem tear seam (50), wherein the emblem tear seam (50) is displaced laterally relative to an adjacent portion of the tear seam (40), wherein the tear seam (40) has a central leg (40a) arranged vertically, which transitions into a lateral section (40b), then into a curved section (40c), into another lateral section (40d), which then transitions into another central leg (40e) wherein a cross-sectional general shape of each section of the tear seam (40) is generally triangular, wherein the cross-section of the tear seam (40) includes a generally triangular shaped portion with two opposed tapered legs (140a) and a lateral leg (140b) with a generally flat center (140c), wherein a width of the flat center (140c) is approximately 0.3 mm, and an angle A, between legs (140a) and (140b) is about 40 degrees.

14. The driver-side airbag cover of claim 13 wherein emblem tear seam (50) has a cross-sectional general shape of a section of the emblem tear seam (50) that is generally triangular includes a center flat portion (50a) which is about 0.5 mm wide.

15. The driver-side airbag cover of claim 14 wherein the cross-section of a center portion of emblem tear seam (50) is generally triangular in shape with an angle B between legs (50b) and (50c) of about 10 degrees.

16. The driver-side airbag cover of claim 15 wherein emblem tear seam (50) has another triangular portion with legs (50d) and (50e), and an angle C between these legs is about 25 degrees.

17. The driver-side airbag cover of claim 16 wherein the angle between legs (50b) and (50c) is less than the angle between legs (50d) and (50e) and the angle between legs (140a) and (140b) is larger than each of the foregoing angles.

18. The driver-side airbag cover of claim 13 wherein the two tear seams (40) and (50) are offset by a dimension d which can be in the range of about 2 to 5 mm.

19. The driver-side airbag cover of claim 13 wherein offset-ting tear seams (40) and (50) exhibits increased strength compared to when the tear seams are aligned.

20. The driver-side airbag cover of claim 19 wherein the tear seams (40) and (50) being offset form a bridge between material on the cover (20) and material of the emblem (30) creating a stronger effective tear seam region over the cover (20) and emblem (30) which is thereby self-reinforced.

* * * * *